United States Patent
Reedy et al.

(10) Patent No.: US 10,336,182 B2
(45) Date of Patent: Jul. 2, 2019

(54) VEHICLE CANISTER MOUNTING ARRANGEMENT

(71) Applicant: Honda Motor Co., Ltd., Tokyo (JP)

(72) Inventors: Chris Reedy, Marysville, OH (US); Brad Krempasky, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 104 days.

(21) Appl. No.: 15/616,070

(22) Filed: Jun. 7, 2017

(65) Prior Publication Data

US 2018/0354356 A1 Dec. 13, 2018

(51) Int. Cl.
*B60K 15/063* (2006.01)
*B60K 15/035* (2006.01)
*B60K 15/01* (2006.01)
*B62D 21/17* (2006.01)

(52) U.S. Cl.
CPC .......... *B60K 15/035* (2013.01); *B60K 15/01* (2013.01); *B60K 15/063* (2013.01); *B62D 21/17* (2013.01); *B60K 2015/03514* (2013.01); *B60K 2015/0632* (2013.01)

(58) Field of Classification Search
CPC .... B60K 2015/0632; B60K 2015/2015; B60K 2015/03514; B60K 15/035
USPC .................................. 180/218, 219; 280/834
See application file for complete search history.

(56) References Cited

U.S. PATENT DOCUMENTS

| 5,409,264 | A | * | 4/1995 | Nakatani | B60K 15/03504 280/784 |
|---|---|---|---|---|---|
| 5,702,125 | A | * | 12/1997 | Nakajima | B60K 15/03504 280/834 |
| 6,308,987 | B1 | | 10/2001 | Mitake | |
| 7,810,842 | B2 | * | 10/2010 | Ichikawa | F02M 25/089 280/782 |
| 7,841,624 | B2 | * | 11/2010 | Kobayashi | B60K 15/03504 180/69.4 |
| 8,210,302 | B2 | | 7/2012 | Mori et al. | |
| 8,439,146 | B2 | | 5/2013 | Tanaka | |
| 8,677,978 | B2 | | 3/2014 | Schisel | |
| 2014/0202783 | A1 | * | 7/2014 | Shomura | F02M 25/0854 180/69.4 |
| 2017/0159617 | A1 | | 6/2017 | Hamamura et al. | |

FOREIGN PATENT DOCUMENTS

| DE | 102010006519 A1 | 8/2011 |
| GB | 2394455 B | 2/2006 |
| JP | 2015010578 B2 | 11/2011 |
| JP | 4860032 A | 1/2015 |

* cited by examiner

*Primary Examiner* — Tony H Winner
(74) *Attorney, Agent, or Firm* — Honda Patents & Technologies North America, LLC; Clifford B Vaterlaus

(57) ABSTRACT

A canister mounting arrangement includes a vehicle frame having a plurality of base members for supporting at least one seat in an occupant area, a pair of front upright members extending in an upward direction with respect to the base members and positioned at a forward portion of the occupant area, and a pair of rear upright members extending in an upward direction with respect to the base members and positioned at a rearward portion of the occupant area. The arrangement includes a fuel tank and a canister for receiving vapor from the fuel tank. The canister is mounted in a location above the base members, behind the front upright members and in front of the rear upright members.

20 Claims, 7 Drawing Sheets

VEHICLE CANISTER MOUNTING ARRANGEMENT

BACKGROUND

The disclosed subject matter relates to vehicles having evaporative emission control equipment. More particularly, the disclosed subject matter relates to the arrangement of evaporative emissions control equipment in off-road vehicles.

Conventionally it is known that vehicles powered by internal combustion engines have a fuel tank for storing fuel. Vaporized fuel may accumulate in the fuel tank and may sometimes leak into the surrounding environment. Such loss of vaporized fuel may reduce fuel efficiency and may be unwanted.

In order to reduce the undesirable effects of such evaporative emissions, control equipment is sometimes applied to vehicles. Evaporative emission control equipment may include canisters having an absorbent material, such as active carbon, to remove the vaporized fuel from the fuel tank. The fuel may then be returned to the engine for combustion during operation of the engine.

Automobiles sometimes have carbon canisters mounted to the vehicle body using rigid mounting devices. Such arrangements are suitable for automobiles that usually travel on paved roads without excessive jarring or vibrations. However, off-road vehicles may add challenges in mounting carbon canisters that are not encountered with typical automobiles. For example, off-road vehicles are often subjected to larger vibrations caused by driving on rough surfaces. Such vibrations may adversely affect the utility or wear of the carbon canisters. Moreover, off-road vehicles are often subjected to harsh conditions, including muddy, wet, or dirty conditions that may adversely affect the carbon canisters if not properly protected.

It would therefore be desirable to provide a canister mounting arrangement that helps to reduce the vibrations experienced by the canister. It would also be desirable to provide a canister mounting arrangement that allows the canister to be protected from harsh environmental conditions.

SUMMARY

In accordance with one embodiment of the present disclosure, a vehicle canister mounting arrangement is provided. The canister mounting arrangement includes a vehicle frame. The frame includes a plurality of base members for supporting at least one seat in an occupant area, a pair of front upright members extending in an upward direction with respect to the base members and positioned at a forward portion of the occupant area, and a pair of rear upright members extending in an upward direction with respect to the base members and positioned at a rearward portion of the occupant area. The arrangement also includes a fuel tank and a canister for receiving vapor from the fuel tank. The canister is mounted in a location above the base members, behind the front upright members and in front of the rear upright members.

In accordance with another embodiment of the present disclosure, a vehicle canister mounting arrangement includes a vehicle frame for supporting a pair of seating surfaces in an occupant area. A dashboard is positioned at a forward portion of the occupant area. A console extends from a location between the pair of seating surfaces toward the dashboard. The canister mounting arrangement includes a fuel tank and a canister for receiving vapor from the fuel tank, the canister being mounted in the console.

In accordance with yet a further embodiment of the present disclosure, a vehicle canister mounting arrangement comprises a vehicle frame having a plurality of tubular members. A pair of seating surfaces is provided in a side-by-side configuration in an occupant area. The canister mounting arrangement further comprises a fuel tank and a canister for receiving vapor from the fuel tank, the canister being mounted to one of the plurality of tubular members.

BRIEF DESCRIPTION OF THE DRAWINGS

Certain embodiments of the present disclosure will be better understood from the following description taken in conjunction with the accompanying drawings in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIGS. 1-7, wherein like numbers indicate the same or corresponding elements throughout the views.

Figure 1:
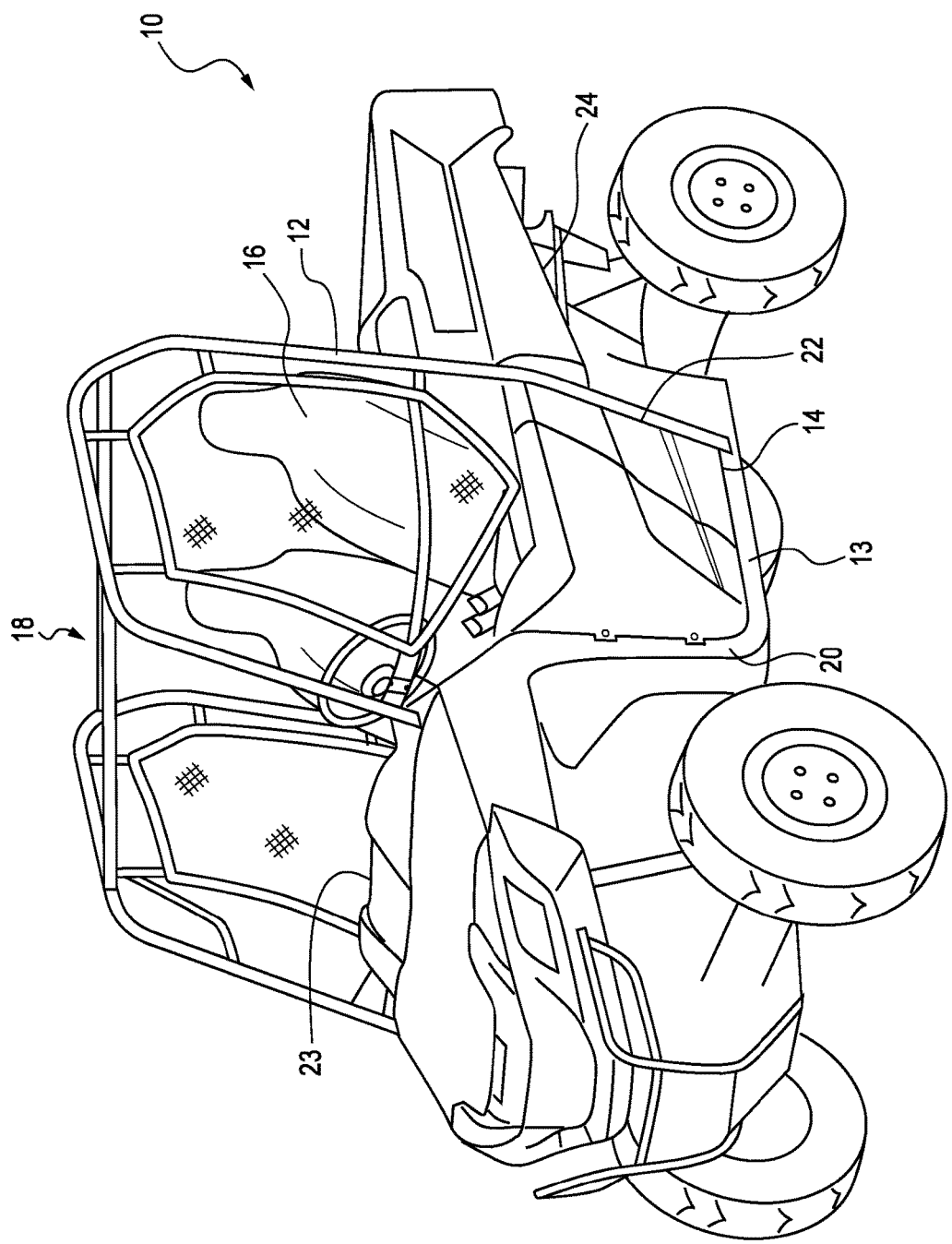
FIG. 1 is a front perspective view depicting a vehicle in accordance with one embodiment of the present disclosure.

FIG. 1 illustrates a perspective view of a vehicle, indicated generally at 10, in accordance with one embodiment of the present disclosure. The vehicle 10 is shown as an off-road vehicle. However, vehicles in accordance with alternative embodiments can comprise any variety of vehicles, including automobiles, trucks, vans, recreational vehicles, utility vehicles, agricultural equipment, or construction equipment, for example.

Figure 2:
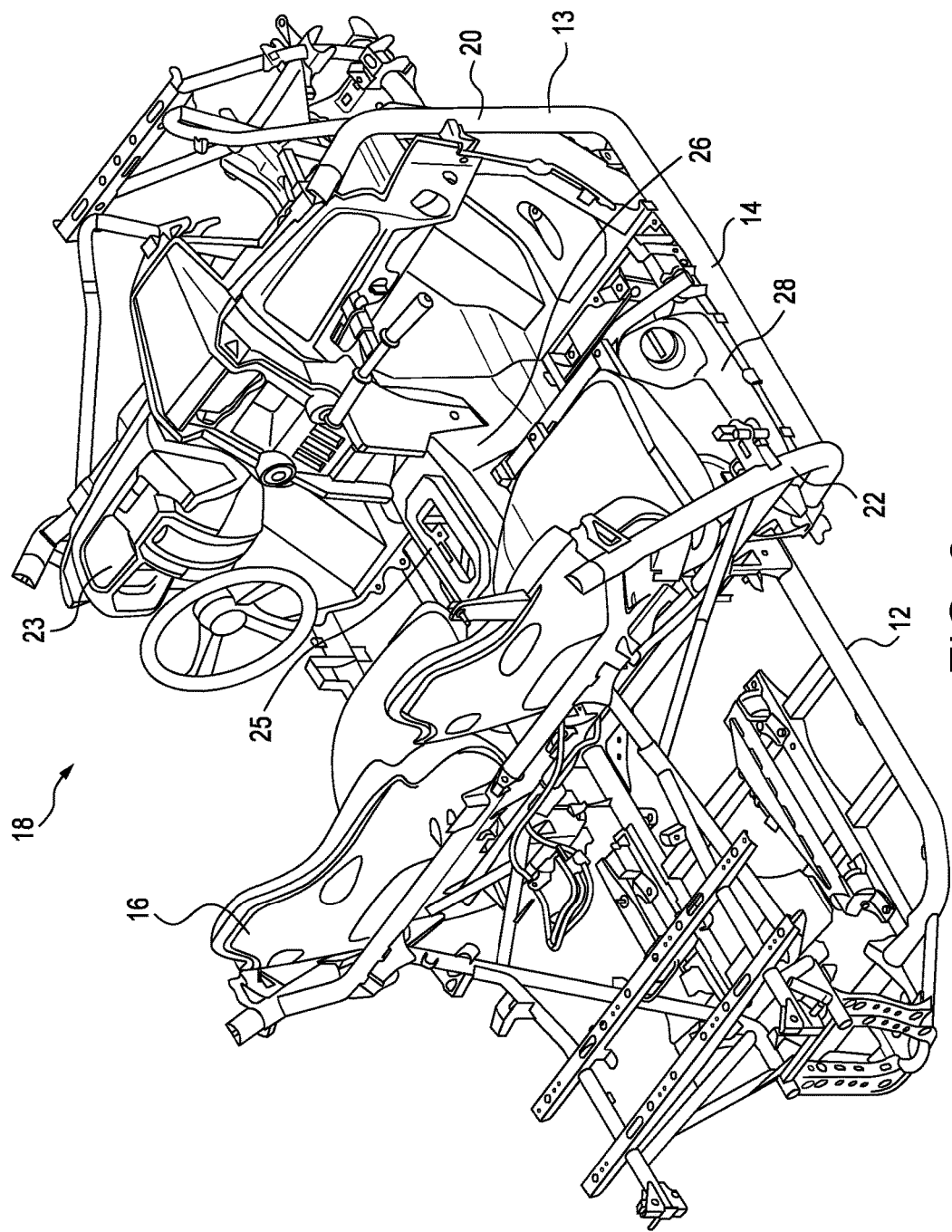
FIG. 2 is a top perspective view of a portion of a vehicle including a dashboard and console in accordance with the concepts of the present disclosure.
Figure 3:
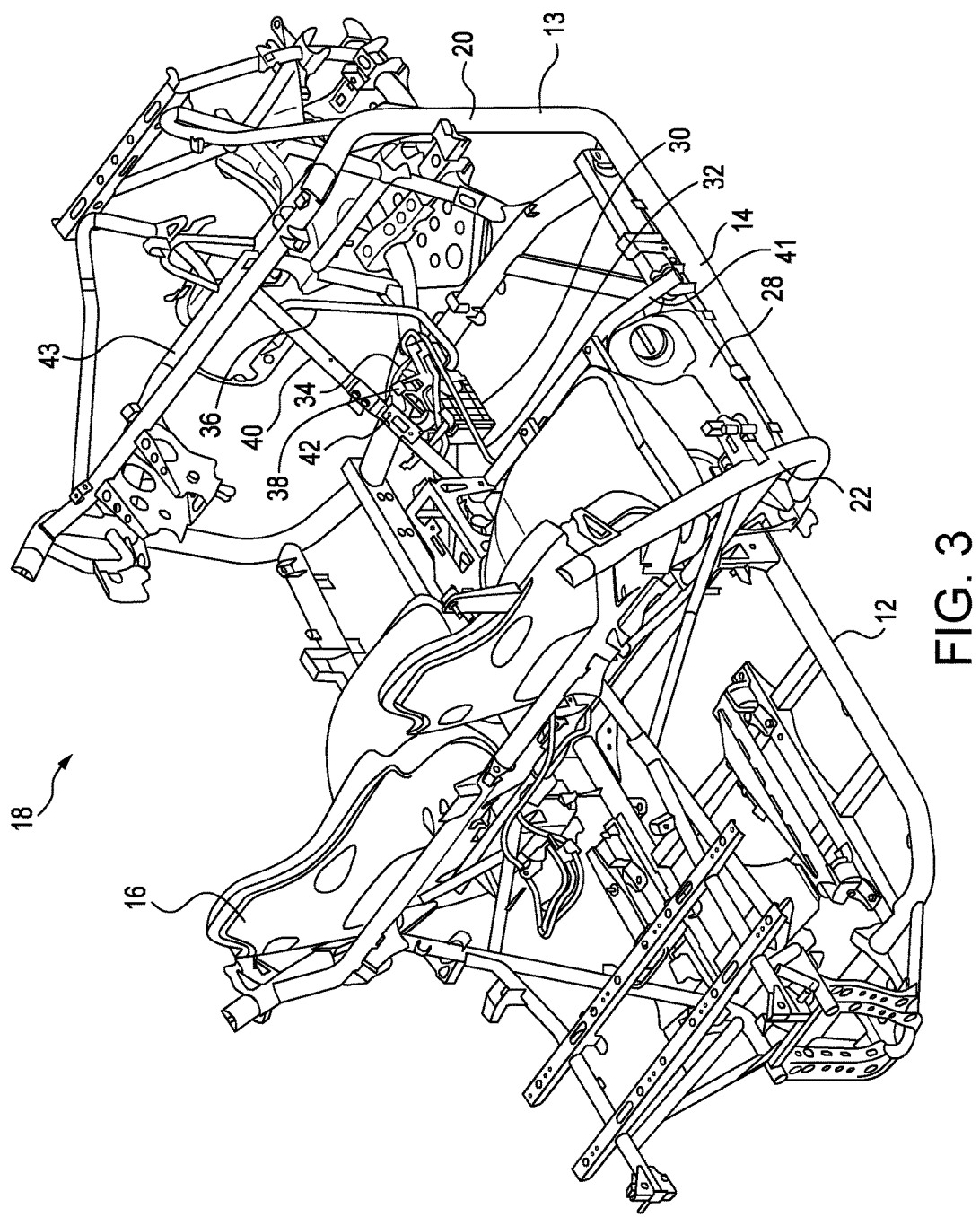
FIG. 3 is a top perspective view of the portion of the vehicle of FIG. 2 with the dashboard and console cover removed.
Figure 4:
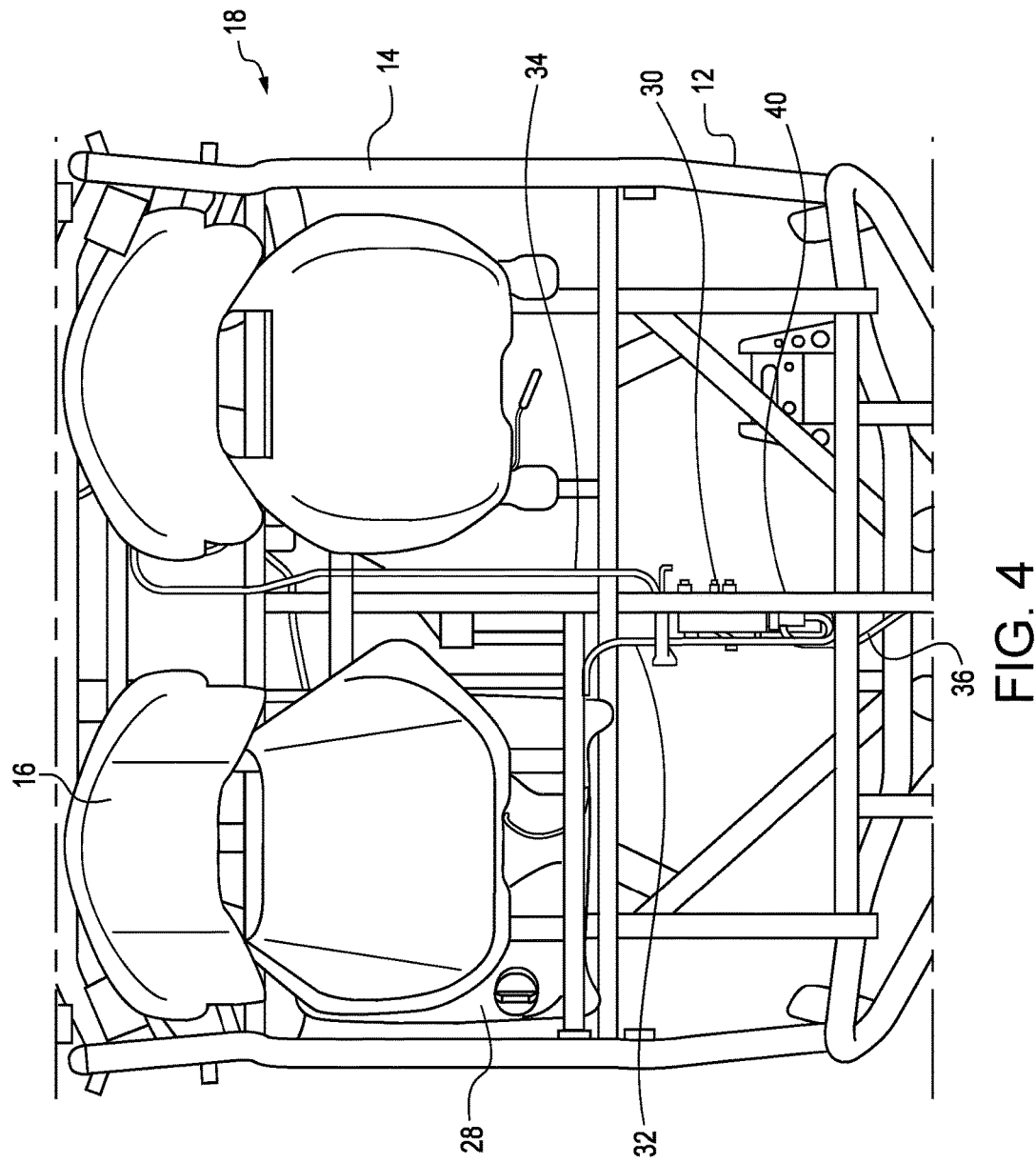
FIG. 4 is a top view of a portion of a vehicle in accordance with the concepts of the present disclosure.

The vehicle 10 may include a vehicle frame 12, also shown for clarity in FIGS. 2-3, comprised of a plurality of frame members 13. The frame members 13 may be tubular and may be connected together by welding or fasteners, for example. The vehicle frame 12 may include a plurality of base members 14 for supporting at least one seat 16 in an occupant area, indicated generally at 18. The frame 12 may include a pair of front upright members 20 extending in an upward direction with respect to the base members 14 and positioned at a forward portion of the occupant area 18. The frame 12 may also include a pair of rear upright members 22 extending in an upward direction with respect to the base members 14 and positioned at a rearward portion of the occupant area 18. The front upright members 20 and the rear upright members 22 may form part of a roll protection structure that is particularly suitable for use in off-road vehicles. It will also be understood that in one embodiment, the base members 14, the front upright members 20, and the rear upright members 22 may form part of the plurality of tubular frame members 13 of the frame 12.

It will be appreciated that the seats 16 may be arranged in any manner, and may include bench seats or bucket seats to provide seating surfaces for occupants of the vehicle 10. The seats 16 may be arranged in a side-by-side configuration, and may be arranged in a single row or multiple rows within the scope of the present disclosure.

The vehicle 10 includes an engine 24, such as an internal combustion engine, of any suitable size and configuration for providing a motive power to the vehicle 10. In one embodiment, the engine 24 may be supported by the vehicle frame 12 at a location behind the seats 16. However, in alternative embodiments, the engine 24 may be located in a central or front portion of the vehicle 10.

Referring to FIG. 2, which depicts a top perspective view of a portion of a vehicle 10, a dashboard 23 may be located at a forward portion of the occupant area 18. The dashboard 23 may include various controls, meters, and/or storage compartments suitable for assisting in operation of the vehicle 10 in a manner known to those skilled in the art. Similarly, a console 25 may be located in the occupant area 18. The console 25 may include a cover 26 for enclosing an interior space and may extend from a location between the seats 16 toward the dashboard 23.

The vehicle 10 may include a fuel tank 28 for carrying fuel to be used in the engine 24. In one embodiment, the fuel tank 28 may be located below one of the seats 16, such as below the passenger seat. However, it will be understood that in alternative embodiments, the fuel tank 28 may be located under the driver's seat or in front of or behind the seats 16.

As shown in FIG. 3, which depicts a top perspective view of the vehicle 10 with the dashboard 23 and console cover 26 removed, the vehicle 10 may include evaporative emission control equipment including a canister 30. The canister 30 may contain a material, such as activated carbon, that absorbs fuel vapors. The evaporative emission control equipment may include a first conduit 32 extending from the fuel tank 28 to the canister 30, a second conduit 34 (shown most clearly in FIG. 4) extending from the canister 30 to the engine 24 (shown in FIG. 1), and an air intake conduit 36 for providing air to the canister 30. The evaporative emission control equipment may also include a purge valve 38 (shown most clearly in FIGS. 5-7) that can be activated as desired by an electronic control unit (ECU, not shown) to allow the fuel in the canister 30 to be purged.

In use, fuel vapors in the fuel tank 28 pass through the first conduit 32 to the canister 30 where the carbon absorbs the fuel. At an appropriate time, the ECU sends a signal to the purge valve 38 to open. The engine 24 creates a vacuum such that air is drawn into the canister 30 through the air intake conduit 36 to purge the fuel from the canister 30 and direct the fuel through the second conduit 34 to the engine 24 to be combusted.

The canister 30 may be positioned in a location close to the center of gravity of the vehicle 10. It will be appreciated that the center of gravity of the vehicle 10 may be located close to the seats 16. This configuration allows the occupants to experience a more comfortable ride while riding on rough terrain, as movement of parts of the vehicle 10 close to the center of gravity tend to be less than those remote from the center of gravity. Similarly, by locating the canister 30 close to the vehicle center of gravity, the canister 30 can be subjected to less movement and acceleration than would be typical if the canister 30 were positioned at a location further from the center of gravity of the vehicle 10. Thus, the function and durability of the canister 30 may be improved. In one embodiment, the canister 30 may be mounted in a location above the base members 14, behind the front upright members 20 and in front of the rear upright members 22. More specifically, the canister 30 may be mounted in the console 25. It will be understood that alternative embodiments may include the canister 30 mounted under or behind the seats 16.

In the present embodiment, the canister 30 may be positioned relatively close to the fuel tank 28 and the engine 24 to reduce the length of the first conduit 32 and the second conduit 34. Moreover, positioning the canister 30 in the occupant area 18, such as in the console 25 under the console cover 26, may protect the canister 30 from exposure to mud and water to reduce the wear on the canister 30.

In one embodiment, as depicted in FIGS. 3-7, a tubular frame member 40 may extend in a longitudinal direction between and in front of the pair of seats 16. The tubular frame member 40 may comprise one of the plurality of frame members 13 forming the vehicle frame 12. The tubular frame member 40 may be attached to other portions of the frame 12 that support or that are in the area of the seats 16, and may extend to portions of the frame 12 that support or are in the area of the dashboard 23. For example, the tubular frame member 40 may be attached to a cross frame member 41 that may be configured to support the seats 16. The tubular frame member 40 may also be attached at a forward end to a forward cross member 43 in front of the dashboard 23. The tubular frame member 40 may support the console cover 26 and may add strength to the cross frame member 41 and the forward cross member 43. The tubular frame member 40 may be sloped upwardly in a rear to front direction, and the canister 30 may be attached to the tubular frame member 40 through a bracket 42. The air intake conduit 36 for the canister 30 may also be attached to the tubular frame member 40 at a location higher than the canister 30. Increasing the height of the air intake conduit 36 may reduce the likelihood that water or other debris may be ingested into the canister 30.

In one embodiment, the air intake conduit 36 extends to a hollow interior of the tubular frame member 40 to draw intake air from the interior of the tubular frame member 40. The tubular frame member 40 may include openings and/or the tubular frame member 40 may be connected to other portions of the frame 12 using joints and connections that allow air to pass into the interior of the tubular frame member 40. Accordingly, the tubular frame member 40 may assist in filtering the intake air so as to reduce the likelihood that deleterious substances are ingested into the canister 30 through the air intake conduit 36. In some embodiments, a filter material may be placed in the interior of the tubular frame member 40 or the intake conduit 36 to further assist in filtering the intake air.

Figure 5:
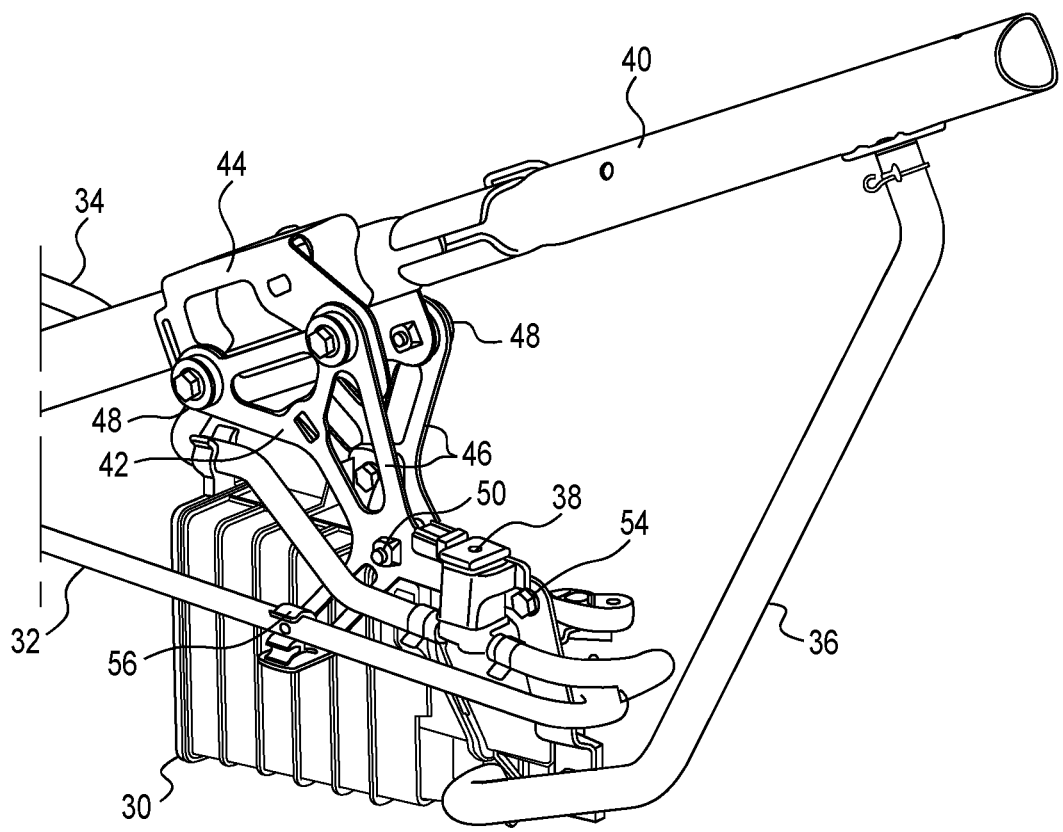
FIG. 5 is a perspective view of a canister mounted on a tubular frame member of a vehicle.
Figure 6:
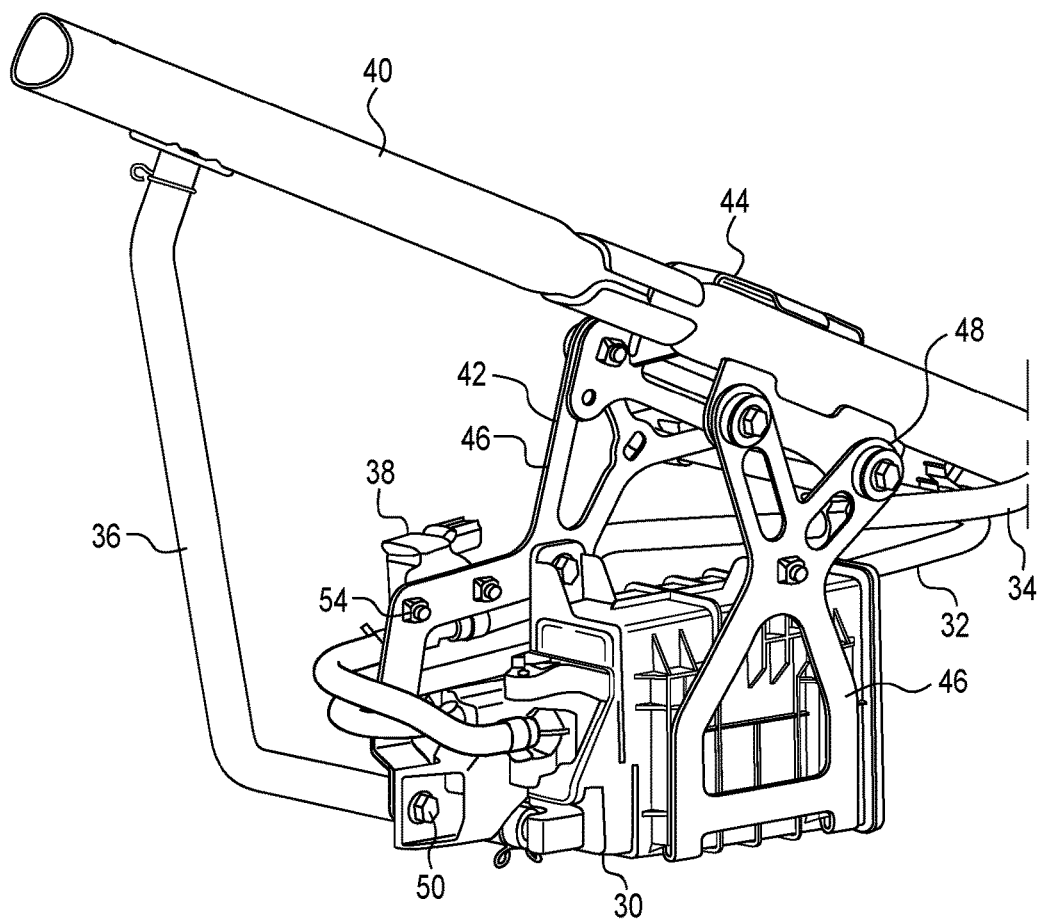
FIG. 6 is a perspective view of the canister of FIG. 5 showing the reverse side of the canister.
Figure 7:
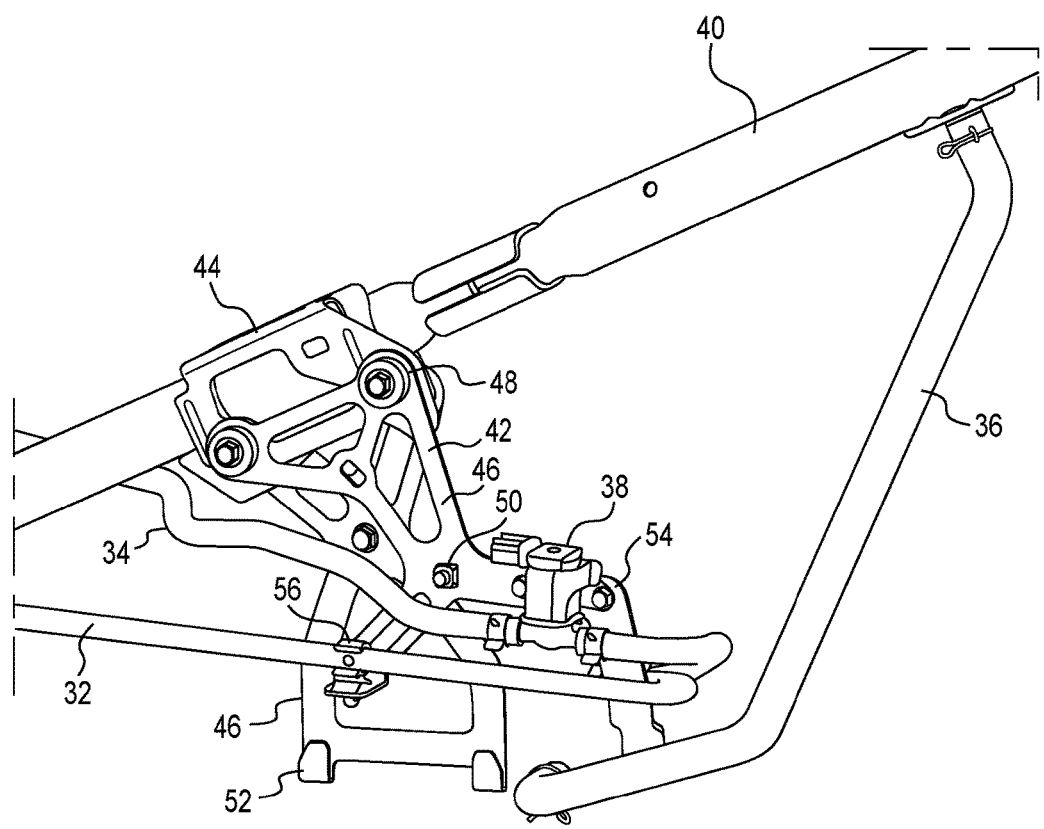
FIG. 7 is a perspective view of the tubular frame member and bracket of FIG. 5 with the canister removed to reveal additional details of the bracket.

With particular reference to FIGS. 5-7, the bracket 42 may be attached to the tubular frame member 40 using welding and/or fasteners. For example, the bracket 42 may include a fixing portion 44 that may be welded or otherwise attached to the tubular frame member 40 with fasteners including bolts, rivets, or the like. The bracket 42 may also include two canister portions 46. Each of the canister portions 46 may be attached to the fixing portion 44 using one or more vibration reduction devices, such as resilient members 48. The resilient members 48 may be formed as collars or grommets to include an opening for receiving a fastener to fasten the canister portions 46 to the fixing portion 44 of the bracket 42. The resilient members 48 may be formed of a resilient material, such as rubber, configured to absorb vibrations carried through the tubular frame member 40 such that the vibration on the canister 30 can be reduced. In one embodiment, four resilient members 48 may be used in attaching the bracket 42 to the tubular frame member 40. Two of the resilient members 48 may be positioned on one side of the bracket 42 as shown most clearly in FIG. 5, and two of the resilient members 48 may be positioned on an opposite side of the bracket 42 as shown most clearly in FIG. 6. It will be understood however, that other quantities of resilient members 48 may be used in accordance with the principles of the present disclosure.

Each of the canister portions 46 of the bracket 42 may also include provisions for attaching the canister 30, such as openings 50 for receiving fasteners. As shown most clearly in FIG. 7, one of the canister portions 46 of the bracket 42 may include a bottom support 52, such as a hook or ledge for extending underneath the canister 30 to support the canister 30 from beneath. Accordingly, the bracket 42 may be configured to support the canister 30 on three sides. It will be understood that alternative embodiments may include a one-piece bracket with a bridging portion for supporting the bottom of the canister 30, or other embodiments of the bracket may be configured to support the canister 30 from only one or two sides. Yet further embodiments of the bracket may be configured to support the canister 30 from four sides.

The bracket 42 may also include a purge valve mount 54 for mounting the purge valve 38 to the bracket 42. The purge valve mount 54 may include an area of the bracket 42 for coupling the purge valve 38 using attaching devices such as threaded fasteners, rivets, welds, adhesives, or the like. Accordingly, the purge valve 38 can be installed at a convenient location with respect to the canister 30 in a manner that facilitates manufacturing and installation of both the canister 30 and the purge valve 38.

The bracket 42 may also include one or more supports or clips 56 for attaching the conduits 32, 34, 36. For example, a clip 56 may be provided for receiving the first conduit 32 from the fuel tank 28 to hold the first conduit 32 with respect to the canister 30. It will be appreciated that the bracket 42 may include other clips for receiving the second conduit 34, the air intake conduit 36 or any other conduit or electrical wiring.

It will be understood that the vehicle canister mounting arrangement described above can be easily accessed to facilitate installation and maintenance of the canister 30. The arrangement also provides for protection of the canister 30 from harsh off-road elements including water, mud and dirt, to improve the durability of the canister 30. Moreover, the present arrangement allows for improved operation and durability of the canister 30 due to reduced accelerations and vibrations applied to the canister 30.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A vehicle canister mounting arrangement comprising:
    a vehicle frame comprising:
        a plurality of base members for supporting at least one seat in an occupant area;
        a pair of front upright members extending in an upward direction with respect to the base members and positioned at a forward portion of the occupant area;
        a pair of rear upright members extending in an upward direction with respect to the base members and positioned at a rearward portion of the occupant area;
    a fuel tank; and
    a canister for receiving vapor from the fuel tank, the canister mounted in a location above the base members, behind the front upright members and in front of the rear upright members;
    wherein the at least one seat comprises a pair of seats arranged side-by-side in the occupant area, and a tubular frame member extends in a longitudinal direction between and in front of the pair of seats, and wherein the canister is attached to the tubular frame member.

2. The vehicle canister mounting arrangement of claim 1, wherein the fuel tank is positioned beneath one of the pair of seats.

3. The vehicle canister mounting arrangement of claim 1, further comprising an engine supported by the frame in a location behind the pair of seats.

4. The vehicle canister mounting arrangement of claim 3, further comprising a first conduit extending from the fuel tank to the canister, a second conduit extending from the canister to the engine, and an air intake conduit for providing air to the canister, the air intake conduit extending into an interior of the tubular frame member.

5. The vehicle canister mounting arrangement of claim 4, wherein the tubular frame member is sloped upwardly in a rear to front direction, and the air intake conduit is attached to the tubular frame member at a location higher than the canister.

6. The vehicle canister mounting arrangement of claim 1, further comprising a bracket attaching the canister to the vehicle frame, wherein the bracket comprises a mount for a purge valve.

7. The vehicle canister mounting arrangement of claim 6, wherein the bracket is attached to the vehicle frame through a resilient member.

8. The vehicle canister mounting arrangement of claim 1, further comprising a dashboard positioned at a forward portion of the occupant area, a console extending from a location between the pair of seats toward the dashboard, and wherein the canister is mounted in the console.

9. The vehicle canister mounting arrangement of claim 1, wherein the canister comprises an air intake conduit for providing air to the canister, the air intake conduit extending to an interior of a tubular frame member portion of the vehicle frame to draw intake air from the interior of the tubular frame member.

10. The vehicle canister mounting arrangement of claim 1, wherein the canister contains a carbon material for absorbing fuel from the vapor from the fuel tank.

11. A vehicle canister mounting arrangement comprising:
a vehicle frame for supporting a pair of seating surfaces in an occupant area;
a dashboard positioned at a forward portion of the occupant area;
a console extending from a location between the pair of seating surfaces toward the dashboard;
a fuel tank; and
a canister for receiving vapor from the fuel tank, the canister mounted in the console.

12. The vehicle canister mounting arrangement of claim 11, wherein the vehicle frame comprises a tubular frame member extending within the console, and wherein the canister is attached to the tubular frame member.

13. The vehicle canister mounting arrangement of claim 12, wherein the canister comprises an air intake conduit for providing air to the canister, the air intake conduit extending to an interior of the tubular frame member to draw intake air from the interior of the tubular frame member.

14. The vehicle canister mounting arrangement of claim 11, wherein the pair of seating surfaces comprises a pair of seats arranged side-by-side in the occupant area, wherein the fuel tank is positioned beneath one of the pair of seats, and an engine is positioned behind the pair of seats.

15. A vehicle canister mounting arrangement comprising:
a vehicle frame comprising a plurality of tubular members for supporting a pair of seating surfaces in a side-by-side configuration in an occupant area;
a fuel tank;
a canister for receiving vapor from the fuel tank, the canister mounted to one of the plurality of tubular members; and
a bracket attaching the canister to the one of the plurality of tubular members, wherein the bracket comprises a mount for a purge valve.

16. The vehicle canister mounting arrangement of claim 15, further comprising a console extending forwardly from a location between the pair of seating surfaces, and wherein the canister is mounted in the console.

17. The vehicle canister mounting arrangement of claim 15, wherein the plurality of tubular members of the vehicle frame comprises:
a plurality of base members for supporting the pair of seating surfaces;
a pair of front upright members extending in an upward direction with respect to the base members and positioned at a forward portion of the occupant area; and
a pair of rear upright members extending in an upward direction with respect to the base members and positioned at a rearward portion of the occupant area.

18. The vehicle canister mounting arrangement of claim 17, wherein the canister is mounted in a location above the base members, behind the front upright members and in front of the rear upright members.

19. The vehicle canister mounting arrangement of claim 15, wherein the one of the plurality of tubular members extends in a longitudinal direction of the vehicle.

20. The vehicle canister mounting arrangement of claim 15, wherein the bracket is attached to the one of the plurality of tubular members through a resilient member.

* * * * *